United States Patent [19]

Peterson

[11] Patent Number: 4,837,452

[45] Date of Patent: Jun. 6, 1989

[54] OFF-LINE DC POWER SUPPLY

[75] Inventor: Donald S. Peterson, Philomath, Oreg.

[73] Assignee: Spectra-Physics, Inc., San Jose, Calif.

[21] Appl. No.: 259,842

[22] Filed: Oct. 19, 1988

[51] Int. Cl.[4] .......................................... H02M 3/335
[52] U.S. Cl. ........................................ 307/2; 307/126;
307/1; 363/19; 363/20; 363/21; 363/97
[58] Field of Search ..................................... 307/34–66,
307/85, 86, 87, 2, 126, 1; 363/18–21, 97

[56] References Cited

U.S. PATENT DOCUMENTS

| | | | |
|---|---|---|---|
| 4,331,912 | 5/1982 | Ruesch et al. | 363/21 X |
| 4,353,113 | 10/1982 | Billings | 363/21 |
| 4,389,702 | 6/1983 | Clemente et al. | 363/97 X |
| 4,453,206 | 6/1984 | Voight | 363/19 |
| 4,535,399 | 8/1985 | Szepesi | 363/97 X |
| 4,623,960 | 12/1986 | Eng | 363/21 |
| 4,631,652 | 12/1986 | Wendt | 363/97 X |
| 4,692,853 | 9/1987 | de Sartre et al. | 363/97 X |
| 4,694,386 | 4/1987 | de Sartre | 363/49 |
| 4,787,020 | 11/1988 | Hiramatsu et al. | 363/20 |

Primary Examiner—William M. Shoop, Jr.
Assistant Examiner—Paul Ip
Attorney, Agent, or Firm—Killworthy, Gottman, Hagan & Schaeff

[57] ABSTRACT

A method and apparatus are disclosed for controlling an off-line dc power supply circuit including a printed circuit board. The power supply circuit comprises a source of unregulated dc input power and a power transformer which separates the circuit into a primary side and a secondary side. An error amplifier compares an output dc voltage generated at a secondary winding of the power transformer to a reference voltage to generate an error signal representative of the difference error therebetween. The error signal is coupled from the secondary side of the power supply circuit to the primary side of the power supply circuit by means of a capacitor formed from traces on opposite sides of the printed circuit board. A solid state switch selectively connects the unregulated dc input power to a primary winding of the power transformer to regulate the power supply circuit in the primary side of the circuit in response to the error signal which is generated in the secondary side of the circuit. The error signal is converted to a frequency signal for coupling from the secondary to the primary sides where it controls a one shot circuit, the output of which is filtered to generate a control signal corresponding to the error signal for regulation of the off-line dc power supply.

14 Claims, 2 Drawing Sheets

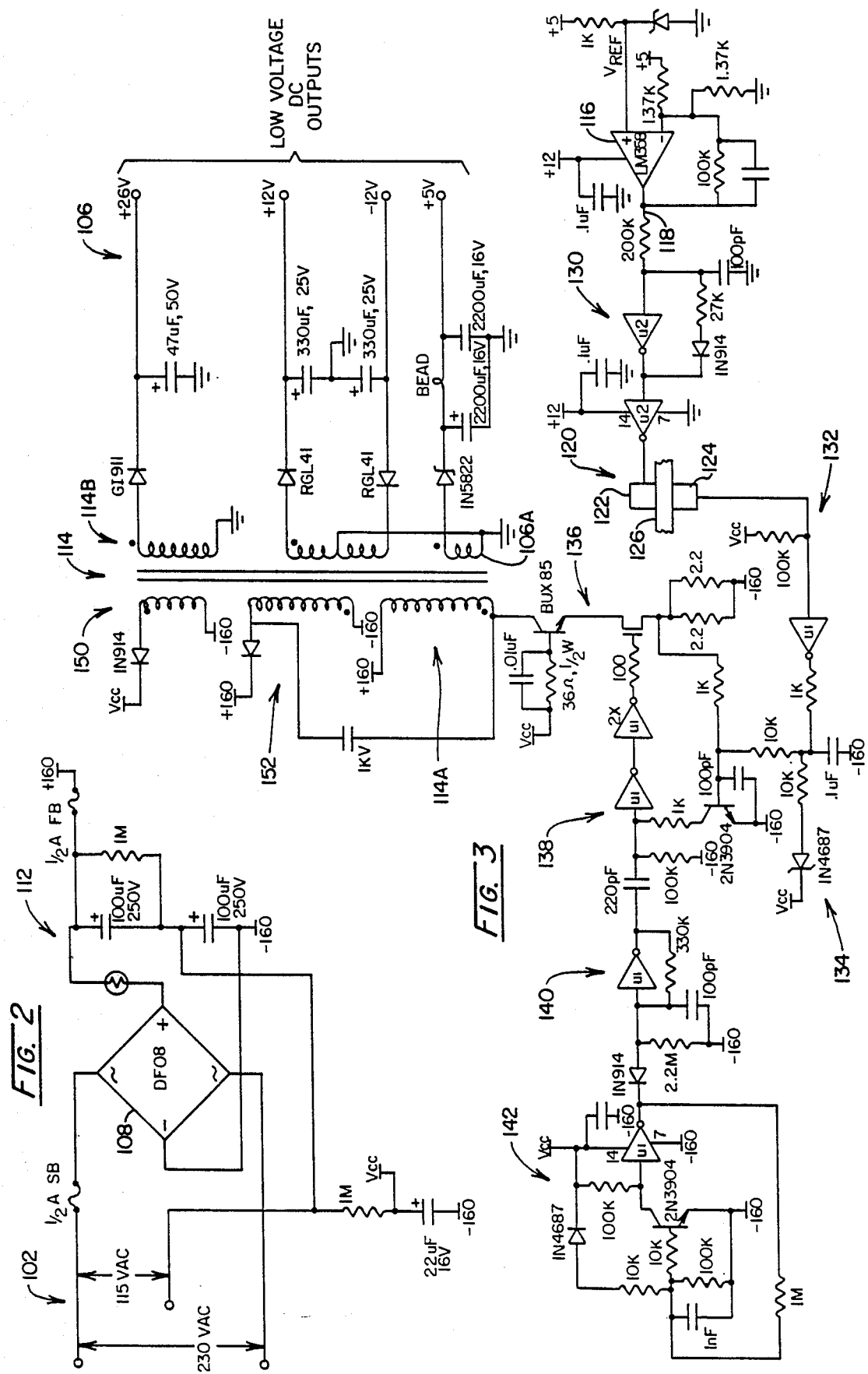

OFF-LINE DC POWER SUPPLY

BACKGROUND OF THE INVENTION

The present invention relates generally to dc power supplies, and more particularly to a method and apparatus for accurately controlling an off-line dc power supply while ensuring isolation of the primary and secondary sides of the power supply circuit.

An "off-line" power supply is one which is directly operated from an alternating current (ac) line source with no isolation between the ac source and the power supply. Accordingly, for safety reasons and to obtain an Underwriter's Laboratory (UL) seal of approval, isolation between the ac line source and the dc output(s) of the power supply must be failsafe.

To this end, off-line power supplies in the past have been regulated either by controlling a primary side output, or a secondary side output by means of an isolated feedback of the secondary side output through a transformer or an optocoupler. Unfortunately, control of a primary side output results in poor regulation of the power supply, and transformers and optocouplers are relatively expensive, and therefore preferably should be eliminated from the power supply if possible. Further, available integrated circuits which can control the power supply in response to an adequately isolated secondary output signal also add to the cost of the power supply and consume in excess of one half watt of power.

Accordingly, there is a need for an inexpensive primary/secondary link to permit satisfactory regulation of off-line operated power supplies and also to ensure isolation of the primary side of the power supply circuit from the secondary side. It would be further advantageous if a control circuit for operation with such a primary/secondary link consumed very little power and, in particular, well below that consumed by commercially available integrated circuit regulators.

SUMMARY OF THE INVENTION

The need for inexpensive isolation for off-line dc power supplies, as well as reduced power consumption are met by the method and apparatus of the present invention for controlling an off-line dc power supply circuit. Components of a power supply are mounted on a printed circuit board (PCB) with circuit traces on the opposite sides of the board forming a capacitor which couples or links the primary and secondary sides of the circuit for accurate power regulation by means of an efficient controller circuit which reduces power consumption in comparison to available integrated circuit regulators. In particular, a secondary output of the supply is compared to a reference voltage to generate an error signal having a voltage level representing the difference error between the secondary output and the reference voltage. The difference error voltage signal is converted to a varying frequency signal which is coupled across the capacitor formed by circuit traces on opposite sides of the PCB. This PCB capacitor forms a portion of a one shot circuit the output of which is filtered to generate a regulation control signal for the off-line power supply.

According to one aspect of the present invention, a method for controlling an off-line dc power supply circuit including a power transformer which separates the circuit into a primary side and a secondary side and a printed circuit board associated with the circuit and/or supporting components thereof comprises the steps of: (a) generating a souce of unregulated dc input power; (b) selectively connectiong the unregulated dc input power to a primary winding of the power transformer which also has at least one secondary winding; (c) comparing an output dc voltage generated at a secondary winding of the power transformer to a reference voltage to generate an error signal representative of the difference error therebetween; (d) coupling the error signal from the secondary side of the power supply circuit to the primary side of the power supply circuit through the printed circuit board via a capacitor formed from traces on opposite sides of the printed circuit board; and (e) controlling step (b) in the primary side of the power supply circuit in response to the error signal.

The step of coupling the error signal from the secondary side of the circuit to the primary side of the circuit preferably comprises converting the error signal to a variable frequency signal, the frequency of which represents the difference error. A lockout feature may be provided which monitors the input power for the dc power supply circuit to prevent operation of the power supply unless the input power is at a minimum operating voltage level. Control regulation is performed by repetitively connecting the unregulated dc power supply to a primary winding of the transformer and disconnecting the input power supply before the next connection time with the disconnect times being determined by the error signal to thereby regulate the dc output voltage. The step of repetitively connecting the unregulated dc input power supply to a primary winding of the power transformer is preferably performed at transitions of a signal generated by an oscillator circuit with the operation of the oscillator circuit being controlled by the lockout monitoring operation.

In accordance with another aspect of the present invention, an off-line dc power supply circuit including a printed circuit board associated therewith and/or supporting components of the circuit comprises a source of unregulated dc input power. A power transformer having at least one primary winding and at least one secondary winding separates the power supply circuit into a primary side and a secondary side. Comparator means are provided for comparing an output dc voltage generated at a secondary winding of the power transformer to a reference voltage to thereby generate an error signal representative of the difference error therebetween. Primary/secondary isolation means are provided for coupling the error signal from the secondary side of the power supply circuit to the primary side of the power supply circuit, and comprises a capacitor formed from traces on opposite sides of the printed circuit board. Power supply control means provide for a selectively connecting the unregulated dc input power to a primary winding of the power transformer to regulate the power supply circuit in the primary side thereof in response to the error signal which is generated in the secondary side thereof.

Preferably, the voltage level of the error signal is representative of the difference error and the primarly/secondary isolation means further comprises a voltage to frequency converter circuit, for example a voltage controlled oscillator. The variable frequency signal representative of the difference error is coupled through the circuit board capacitor which forms a portion of a one shot circuit. The output of the one shot circuit is filtered and used to define turn off time for switch means which are repetitively activated to connect the unregulated dc input power to the primary of the power transformer. The switch means is turned on by transitions of an oscillator and turned off at a point in each cycle of the output signal of the oscillator determined by the output of the filter circuit and hence, the error signal. Means connected to the oscillator, are provided for monitoring the input power for the power supply circuit to prevent operation of the power suply circuit unless the input power is at a minimum operating voltage level. Preferably, the switch means comprises a cascode power switch.

It is an object of the present invention to provide a method and apparatus for controlling an off-line dc power supply circuit from the secondary side of the circuit by means of capacitor coupled feedback which is linked to the primary side of the circuit through a failsafe capacitor formed by traces on opposite sides of an associated printed circuit board; to provide a method and apparatus for efficiently and accurately regulating an off-line dc power supply circuit by generating an error signal in the secondary side of the circuit, converting that error signal to a varying frequency signal which is linked to the primary side by means of a failsafe capacitor formed by traces on opposite sides of an associated printed circuit board where it is converted back in the primary side of the circuit to a voltage level which is used to control the regulation of the power supply; and, to provide such a method and apparatus for regulating an off-line dc power supply circuit which will operate only if the input power to the circuit is at a minimum operating voltage level.

Other objects and advantages of the invention will be apparent from the following description, the accompanying drawings and the appended claims.

BRIEF DESCRIPTION OF THE DRAWINGS

FIGS. 2 and 3 form a more detailed electrical schematic diagram of the present invention with FIG. 2 showing the un regulated dc input source and FIG. 3 showing the remainder of the off-line dc power supply circuit.

DETAILED DESCRIPTION OF THE INVENTION

Figure 1:
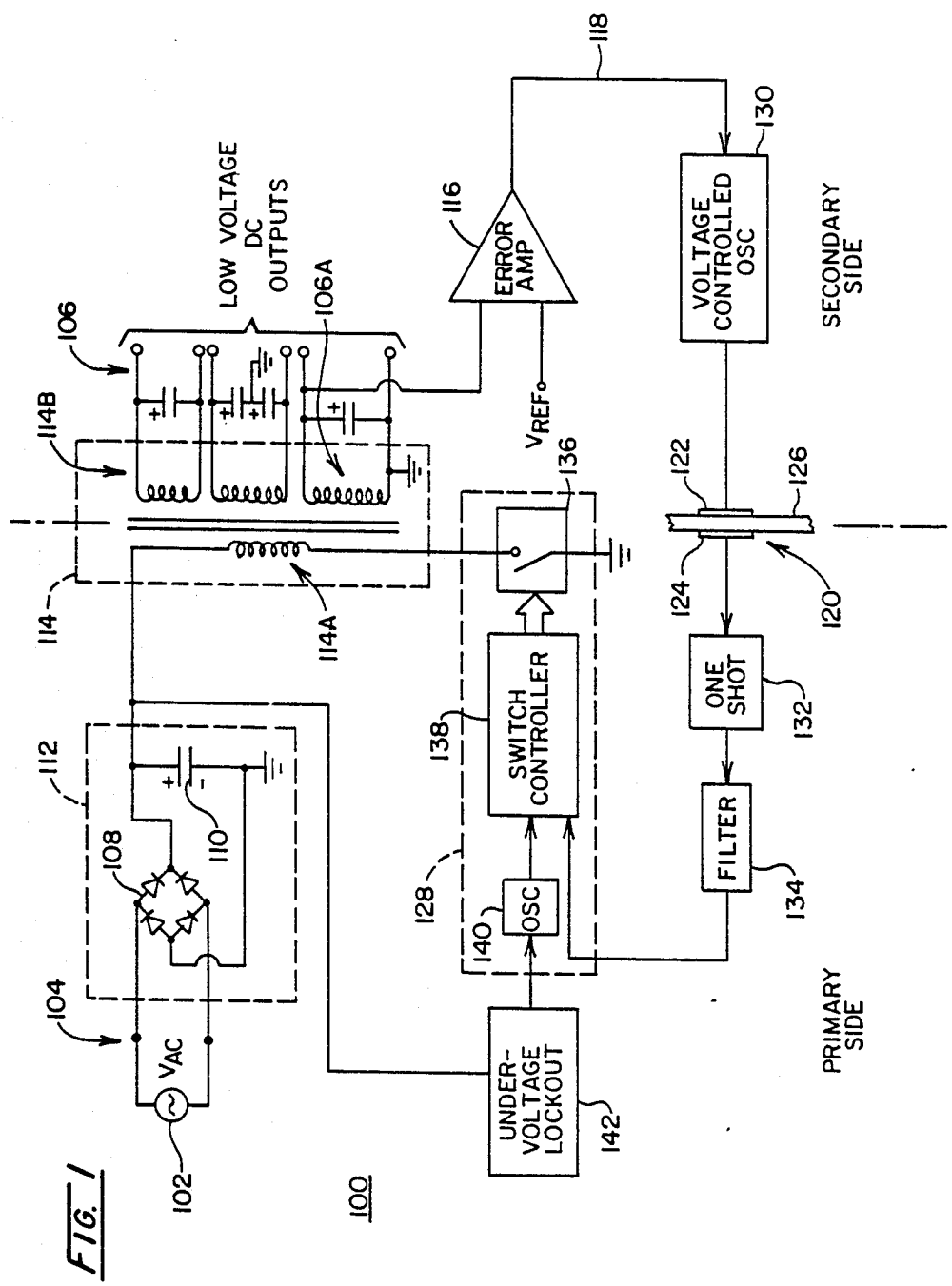
FIG. 1 is a schematic block diagram of an off-line dc power supply circuit according to the present invention.

An off-line dc power supply circuit 100 in accordance with the present invention is shown in schematic block diagram form in FIG. 1. In an off-line operated power supply, a source 102 of dc power is directly connected to the power supply such that isolation between the input 104 of the current and the output(s) 106 must be maintained within the power supply circuit to ensure that a failure within the circuit does not connect the ac source 102 to one or more of the outputs 106.

The ac source 102 is fully rectified by means of a bridge circuit 108 and passed to a storage capacitor 110 to form a source 112 of unregulated dc input power. A power transformer 114 having at least one primary winding 114A and at least one secondary winding 114B separates the power supply circuit 100 into a primary side and a secondary side. Comparator means comprising an error amplifier 116 compare an output dc voltage generated at a secondary winding 106A of the power transformer 114 to a reference voltage $V_{REF}$ to generate a difference error signal on a conductor 118, with the voltage level of the error signal being representative of the difference between the two voltages.

Primary/secondary isolation means provide for coupling the error signal on the conductor 118 from the secondary side of the power supply circuit 100 to the primary side of the power supply circuit 100 and comprises a capacitor 120 formed from traces 122 and 124 formed on opposite sides of a printed circuit board 126 which is associated with and/or supports electrical components of the power supply circuit 100. If the traces 122 and 124 are approximately ½ inch by 1 inch and the circuit board is 0.060 fiberglass, the capacitor 120 will have a capacitance of approximately 4 picofarads.

The voltage level of the error signal on the conductor 118 is representative of the difference error between the output voltage on the secondary winding 106A and the reference voltage $V_{REF}$. In addition to the capacitor 120, the primary/secondary isolation means comprises a voltage to frequency circuit for generating a varying frequency output signal which, in the illustrated embodiment, comprises a voltage controlled osicillator 130. The primary/secondary isolation means further comprises a one shot circuit 132 which includes the printed circuit board capacitor 120 as is most clearly shown in FIG. 3. A filter circuit 134 is connected to the output of the one shot circuit 132 for generating an output signal having a voltage level which is proportional to the frequency of the signal generated by the voltage controlled osicillator 130, and hence the difference error signal on the conductor 118. Power supply control means 128 provide for selectively connecting the unregulated dc input power from the source 112 to the primary 114A to regulate the power supply circuit 100 in the primary side of the circuit in response to the error signal on the conductor 118 which is generated in the secondary side of the circuit 100. The power supply control means 128 comprises switch means 136 connected to the primary winding 114A for selectively connecting the unregulated dc input power from the source 112 to the primary winding 114A and switch controller means 138 for activating the switch means 136.

The power supply control means 128 preferably further comprises an oscillator circuit 140 for generating a repetitive output signal which is passed to a switch controller means 138 which also receives the output of the filter circuit 134. The switch controller 138 is activated at transitions of the output signal from the oscillator circuit 140, and deactivated at a point in each cycle of the output signal from the oscillator circuit 140 determined by the output signal from the filter circuit 134 such that the unregulated input power from the source 112 is applied to the primary winding 114A of the power transformer 114 as a pulse width modulated signal to maintain the dc output voltage on the winding 106A substantially equal to the reference voltage $V_{REF}$. This regulation, of course, also maintains the voltages of the low voltage dc outputs on the remainder of the secondary windings 106.

Preferably, the off-line dc power supply circuit 100 of the present invention further comprises under voltage lockout means circuit 142 which are connected to the source 112 of unregulated dc input power and to the power supply control means 128, and more particularly, to the oscillator 140. The lockout circuit 142 monitors the input power from the source 112 for the power supply circuit 100 to prevent operation of the power supply circuit 100 unless the input power is at a minimum operating voltage level. As shown in the illustrated embodiment, the under voltage lockout circuit 142 inhibits operation of the oscillator 140 until the minimum operating voltage level of the unregulated dc input power from the source 112 is attained.

Reference is now made to FIGS. 2 and 3 which illustrate in greater detail the circuit of the present invention. It should be noted that the switch means 136 preferably comprises a cascode power switch as shown in FIG. 3. The components have been given reference numerals corresponding to those used in FIG. 1. Note that FIGS. 2 and 3 include details which are not specifically required for the invention of present application; however, they are included to show the configuration of a working embodiment of the present invention which has been constructed from the components illustrated. For example, the power supply circuit of FIGS. 2 and 3 includes an auxiliary winding 150 for supplying power to the control circuit and a clamp winding 152 to limit the voltage on the cascode power switch comprising the switch means 136.

Having described the invention in detail and by reference to preferred embodiment thereof, it will be apparent that modifications and variations are possible without departing from the scope of the invention defined in the appened claims.

What is claimed is:

1. A method for controlling an off-line dc power supply circuit including a power transformer which separates said power supply circuit into a primary side and a secondary side, and a printed circuit board supporting components of said power supply circuit, said method comprising the steps of:

(a) generating a source of unregulated dc input power;
    (b) selectively connecting said unregulated dc input power to a primary winding of the power transformer which also has at least one secondary winding;
    (c) comparing an output dc voltage generated at a secondary winding of said power transformer to a reference voltage to generate an error signal representative of the difference error therebetween;
    (d) coupling said error signal from the secondary side of said power supply circuit to the primary side of said power supply circuit through the printed circuit board via a capacitor formed from traces on opposite sides of said printed circuit board; and
    (e) controlling step (b) in the primary side of said power supply circuit in response to said error signal.

2. A method for controlling an off-line dc power supply circuit as claimed in claim 1 wherein step (d) of coupling said error signal from the secondary side of said power supply circuit to the primary side of said power supply circuit comprises converting said error signal to a variable frequency signal, the frequency of which represents said difference error.

3. A method for controlling an off-line dc power supply circuit as claimed in claim 2 further comprising step (f) of monitoring the input power for said dc power supply circuit to prevent operation of said power supply circuit unless said input power is at a minimum operating voltage level.

4. A method for controlling an off-line dc power supply circuit as claimed in claim 3 wherein step (e) comprises step (g) of repetitively connecting said unregulated dc input power supply to said primary winding, and step (h) of disconnecting said input power supply before the next connection time with the disconnection times being determined by said error signal.

5. A method for controlling an off-line dc power supply circuit as claimed in claim 4 wherein step (g) is performed at transitions of a signal generated by an oscillator circuit, the operation of which is controlled by the results of the monitoring operation of step (f).

6. An off-line dc power supply circuit including a printed circuit board supporting components of said power supply circuit which comprises:

a source of unregulated dc input power;
    a power transformer having at least one primary winding and at least one secondary winding separates said power supply circuit into a primary side and a secondary side;
    comparator means for comparing an output dc voltage generated at a secondary winding of said power transformer to a reference voltage to generate an error signal representative of the difference error therebetween;
    primary/secondary isolation means for coupling said error signal from the secondary side of said power supply circuit to the primary side of said power supply circuit and comprising a capacitor formed from traces on opposite sides of the printed circuit board; and
    power supply control means for selectively connecting said unregulated dc input power to a primary winding of said power transformer to regulate said power supply circuit in the primary side thereof in response to said error signal which is generated in the secondary side thereof.

7. An off-line dc power supply circuit as claimed in claim 6 wherein the voltage level of said error signal is representative of said difference error and said primary/secondary isolation means further comprises a voltage to frequency converter circuit for generating a varying frequency output signal.

8. An off-line dc power supply circuit as claimed in claim 7 wherein said voltage to frequency converter circuit comprises a voltage controlled oscillator.

9. An off-line dc power supply circuit as claimed in claim 7 wherein said primary/secondary isolation means further comprises a one-shot circuit including said capacitor.

10. An off-line dc power supply circuit as claimed in claim 9 further comprising lockout means connected to said source of unregulated dc input power and to said power supply control means for monitoring the input power for said power supply circuit to prevent operation of said power supply circuit unless said input power is at a minimum operating voltage level.

11. An off-line dc power supply circuit as claimed in claim 10 wherein said power supply control means comprises switch means connected to said primary winding for selectively connecting said unregulated dc input power thereto and switch controller means for activating said switch means.

12. An off-line dc power supply circuit as claimed in claim 11 further comprising a filter circuit connected to said one-shot circuit for generating an output signal connected to the switch controller means and having a voltage level proportional to the frequency of the signal generated by said voltage to frequency converter and hence said difference error, and wherein said power supply control means comprises an oscillator circuit for generating a repetitive output signal which is connected to said switch controller means such that said switch means is activated at transitions of the output signal of said oscillator circuit and deactivated at a point in each cycle of the output signal of said oscillator circuit determined by the output signal of said filter circuit.

13. An off-line dc power supply circuit as claimed in claim 12 wherein said lockout means is connected to control the operation of said oscillator circuit.

14. An off-line dc power supply circuit as claimed in claim 13 wherein said switch means comprises a cascode power switch.

* * * * *

UNITED STATES PATENT AND TRADEMARK OFFICE
CERTIFICATE OF CORRECTION

PATENT NO. : 4,837,452

DATED : June 6, 1989

INVENTOR(S) : Donald S. Peterson

It is certified that error appears in the above-identified patent and that said Letters Patent is hereby corrected as shown below:

Col. 2, line 2 "souce" should be --source--.
Col. 2, line 3 "connectiong" should be --connecting--.
Col. 2, line 55 delete the a.
Col. 2, line 61 "primarly" should be --primary--.
Col. 3, line 52 "dc" should be --ac--.
Col. 4, line 7 "capactor" should be --capacitor--.
Col. 5, line 27 "appened" should be --appended--.

Signed and Sealed this

Thirty-first Day of March, 1992

Attest:

HARRY F. MANBECK, JR.

*Attesting Officer*  *Commissioner of Patents and Trademarks*